United States Patent
Staehr

(10) Patent No.: US 8,598,753 B2
(45) Date of Patent: Dec. 3, 2013

(54) PUMP ASSEMBLY

(75) Inventor: Uffe Staehr, Hinnerup (DK)

(73) Assignee: Grundfos Management a/s, Bjerringbro (DK)

(*) Notice: Subject to any disclaimer, the term of this patent is extended or adjusted under 35 U.S.C. 154(b) by 92 days.

(21) Appl. No.: 13/119,548

(22) PCT Filed: Aug. 10, 2009

(86) PCT No.: PCT/EP2009/005794
§ 371 (c)(1),
(2), (4) Date: Apr. 27, 2011

(87) PCT Pub. No.: WO2010/031468
PCT Pub. Date: Mar. 25, 2010

(65) Prior Publication Data
US 2011/0241454 A1 Oct. 6, 2011

(30) Foreign Application Priority Data
Sep. 19, 2008 (EP) ..................................... 08016513

(51) Int. Cl.
*H02K 9/00* (2006.01)
(52) U.S. Cl.
USPC ................................. 310/71; 310/64; 310/89
(58) Field of Classification Search
USPC .............................................. 310/71, 89, 64
See application file for complete search history.

(56) References Cited

U.S. PATENT DOCUMENTS

| 3,316,845 | A | | 5/1967 | Schumann | |
|---|---|---|---|---|---|
| 4,712,030 | A | * | 12/1987 | Lakin et al. | 310/89 |
| 5,324,171 | A | | 6/1994 | Cook | |
| 6,107,708 | A | * | 8/2000 | Yamaguchi et al. | 310/58 |
| 6,132,184 | A | | 10/2000 | Robertson et al. | |
| 6,177,740 | B1 | * | 1/2001 | Burns | 310/68 R |
| 6,707,185 | B2 | * | 3/2004 | Akutsu et al. | 310/71 |
| 6,729,433 | B2 | * | 5/2004 | Uryu et al. | 180/444 |
| 7,262,536 | B2 | * | 8/2007 | Rahman et al. | 310/156.35 |

FOREIGN PATENT DOCUMENTS

| DE | 19527879 A1 | 1/1997 |
|---|---|---|
| EP | 1582751 A1 | 10/2005 |
| WO | 2004033241 A1 | 4/2004 |

OTHER PUBLICATIONS

Int'l Search Report issued on Sep. 17, 2009 in Int'l Application No. PCT/EP2009/005794.
Office Action issued Jul. 26, 2010 in DE Application No. 08 016 513.7.

* cited by examiner

*Primary Examiner* — Dang Le
(74) *Attorney, Agent, or Firm* — Panitch Schwarze Belisario & Nadel LLP

(57) ABSTRACT

A pump assembly with a motor housing (4) and with a terminal box (6) which includes at least one peripheral section (10) situated on the outer periphery of the motor housing (4). A cover (12) is provided, which in each case at least partly covers the motor housing (4) and the peripheral section (10) of the terminal box (6) on an axial end-side. The cover (12) is designed in a heat-conducting manner and at an inner side thereof is in contact with at least one electronic complement (14).

12 Claims, 3 Drawing Sheets

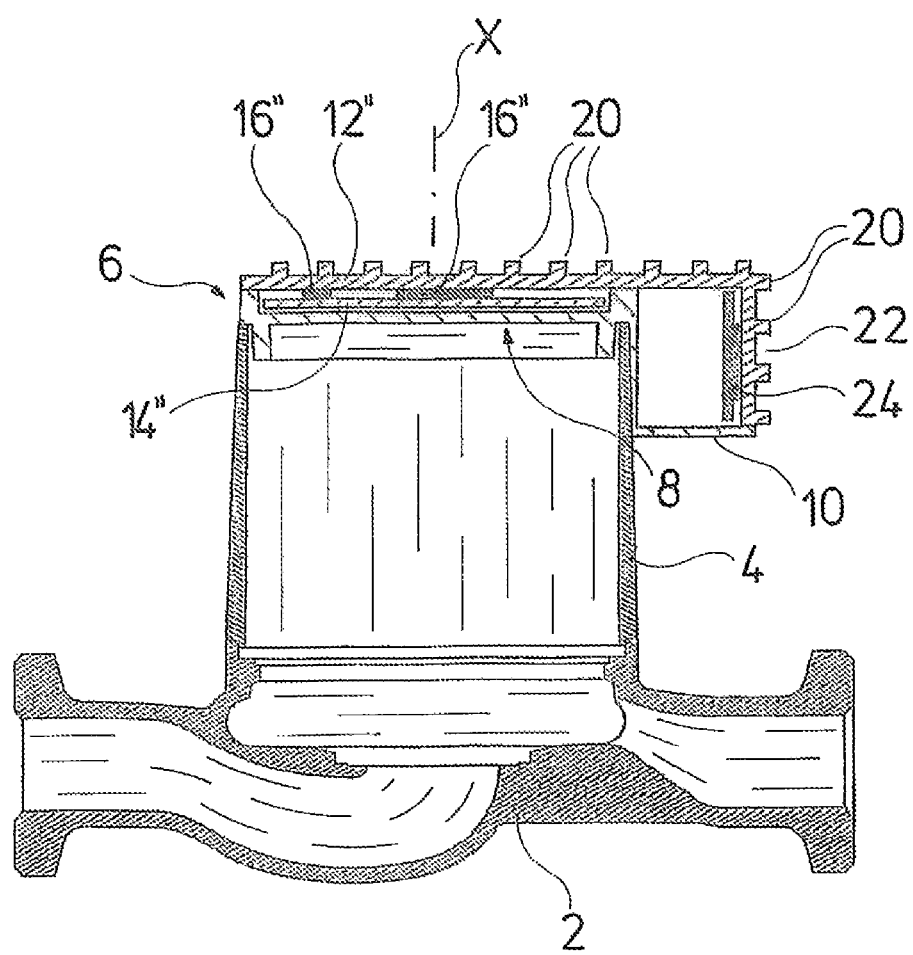

PUMP ASSEMBLY

CROSS-REFERENCE TO RELATED APPLICATIONS

This application is a Section 371 of International Application No. PCT/EP2009/005794, filed Aug. 10, 2009, which was published in the German language on Mar. 25, 2010, under International Publication No. WO 2010/031468 A1 and the disclosure of which is incorporated herein by reference.

BACKGROUND OF THE INVENTION

The present invention relates generally to a pump assembly with a motor housing and with a terminal box.

Pump assemblies usually comprise a terminal box which is applied on the motor or on the stator housing, in which the electrical connection elements and electronic components for the control of the motor are arranged. Thereby, there are terminal boxes which are arranged peripherally or also terminal boxes which are arranged axially on the stator housing. Since with electronically controlled pumps, in particular with a frequency converter, numerous electronic components must be arranged in the terminal box, there are those terminal boxes which are arranged on the axial side of the stator housing and which extend beyond the outer periphery of the stator housing.

With power electronics in the inside of the terminal box, there is the problem that waste heat arises, which must be led away. Cooling bodies are usually used for this. If, with conventional terminal boxes, these cooling bodies are arranged in the inside of the terminal box, ventilation openings are necessary, in order to permit an adequate cooling air supply out of the inside of the terminal box. Since pump assemblies are often applied in a humid environment, openings are however undesirable in the terminal box or there are problems with the sealing of the parts of the terminal box, in which the electronic components are arranged.

BRIEF SUMMARY OF THE INVENTION

With regard to this state of the art, it is an objective of the present invention to improve a pump assembly with a motor housing and with a terminal box, in a manner such that an improved heat removal with a simultaneous reliable sealing of the terminal box to the outside, may be achieved for electronic components in the terminal box.

The above objective is achieved by a pump assembly with the features specified in the independent claim(s). Preferred embodiments are to be deduced from the dependent claims, the subsequent description as well as the attached figures.

The pump assembly according to the present invention comprises a motor housing and a terminal box which is arranged on the outer side of the motor housing. Electrical connection terminals for the pump assembly and/or electronic components for the control or for the operation of the pump assembly may be arranged in the terminal box according to the present invention. Inasmuch as this is concerned, with regard to the terminal box, in the context of the present invention, it may also be the case of a switch box. The terminal box thereby comprises at least one peripheral section which is arranged on the outer periphery of the motor housing or stator housing. The motor housing and the terminal box are, according to the present invention, closed by way of a common cover on the axial side of the pump assembly, i.e. on the end-side of the motor housing or stator housing, seen in the direction of the rotation axis. The common cover thereby is designed such that in each case it at least partly covers the end-side of the motor housing and the end-side of the terminal box. A simplified assembly may be achieved by way of the common cover of the terminal box and the motor housing, since only one cover needs to be assembled for the closure of the motor housing and the terminal box. Moreover, the large cover provides an enlarged surface for the heat removal of the heat arising in the terminal box. Not only is the cover surface of the peripheral section of the terminal box available for the heat removal, but an enlarged surface, since also at least a part of the cover surface which covers the motor housing on the axial side, may be used for heat removal.

In order to improve the heat removal, according to the present invention, the cover is designed in a heat-conducting manner and at its inner side is in contact with at least one electronic component. For example, the electronic component in the inside of the terminal box bears on the inner side of the cover, so that the waste heat produced by the electronic component is led further onto the cover and from this at its outer side may be led away to the outside. In this manner, one may make do without cooling bodies in the inside of the terminal box and in particular without openings in the terminal box. The terminal box may rather be hermetically sealed to the outside, but despite this a good heat removal is indeed ensured through the heat-conductive cover.

Particularly preferably, the cover completely covers the axial end-side of the motor housing and/or of the peripheral section of the terminal box. Thus, a maximal cover surface on the end-side is created, through which the heat removal is improved by way of the larger radiating surface. Moreover, the complete axial side of the stator housing and of the terminal box may be opened by way of removing the cover, so that the stator and the rotor in the inside of the motor housing are completely accessible and a good accessibility to the electronic components and connections in the inside of the terminal box is ensured.

Further preferably, the cover is manufactured of an electrically insulating material. This makes sense for reasons of safety, since a danger to persons may be avoided in the case of defects of the electrical components in the inside of the terminal box. Preferably, the cover as well as the remaining housing of the terminal box is manufactured of plastic.

Alternatively however, it is also possible to form the cover partly or completely of an electrically conductive material, i.e. in particular from metal. By way of such a design, on the one hand one ensures a good thermal conductivity and on the other hand metallic or electrically conductive parts of the cover simultaneously serve for shielding electromagnetic radiation, which is produced by the electronic components in the inside of the terminal box, to the outside. The electromagnetic compatibility of the pump assembly may be improved by way of this.

Particularly preferably, the cover is of a heat-conducting plastic, in particular with a specific thermal conductivity>1 W/mK. Such a plastic unifies several preferred characteristics. On the one hand it is electrically insulating and thus fulfils the desired safety demands. On the other hand it has a large thermal conductivity which is advantageous, in order to be able to adequately cool the electronic components arranged on the inner side or to permit the heat removal from these components.

The at least one electronic component in the inside of the terminal box is in contact with the cover preferably via a thermally conductive medium, in particular a thermally conductive paste or a thermally conductive pad (cushion). Such a thermally conductive medium, such as a thermally conductive paste or a thermally conductive adhesive, creates an optimal thermal transition between the electronic component and the cover. If no thermally conductive medium is arranged between the two parts, then there is the danger that the thermal conductivity is significantly worsened due to the thin air layer between both parts.

According to a particular embodiment of the present invention, the at least one electrical component also, at least in sections, may be integrated into the cover. The thermal conductivity may be improved even further by way of this, since the heat transition between the electronic component and the cover is improved. Moreover, the assembly may also be simplified, since one may make do without an additional assembly step for attaching the electronic component on the cover, as the case may be, amid the use of a thermally conductive medium. Thus the electronic component may particularly preferably be at least partly cast into the material of the cover, in particular plastic.

According to a further preferred embodiment of the present invention, the cover on its outer side may comprise indentations and/or projections which enlarge the surface of the cover on the outer side. The thermal radiating surface on the surface is increased in this manner and the heat removal to the surrounding air is improved by way of this. Thus, the cover itself forms a cooling body for the electronic component, on the inner side. The indentation and/or projections may for example be designed in a rib-like manner, as is known from cooling bodies for electronic components. However, infinitely different shapes are possible, which in particular may be adapted to the outer shaping of the motor housing and terminal box. On the inner side, the cover for the at least one electronic components has a suitable, preferably plane contact surface which permits a large-surfaced contact between the component and the cover.

The cover may furthermore preferably cover the peripheral section of the terminal box additionally on at least one peripheral side which is adjacent to the end-side. In this case, the cover is not designed as a plane surface, but has an angled section which covers the at least one peripheral side of the terminal box. Two positive effects may be achieved by way of this design. On the one hand the cover surface may be further enlarged for improving the heat removal. Moreover, the region of the terminal box which is released by way of removal of the cover is enlarged. Thus, the accessibility to the inner space of the terminal box is improved.

Particularly preferably, the terminal box comprises the peripheral section and additionally an axial section which is applied at the axial end onto the motor housing, wherein the cover at least partly covers the axial end-side of the axial section of the terminal box. This means that the cover with this embodiment does not directly cover the motor housing, but that yet a section of the terminal box is arranged between the cover covering the axial end-side of the motor housing, and the motor housing. Preferably, the stator housing or the motor housing is designed in a tubular manner with an open, axial end-side. Thereby, this open, axial end-side is that end-side of the motor housing which is away from a pump applied onto the motor housing. The axial section of the terminal box thereby closes the axial opening of the motor housing. The terminal box in turn is open to the axial side, wherein this opening then is closed by the cover. Preferably, the terminal box at its axial side is completely covered by the cover. Thus, a particularly large cover surface for improving the thermal radiating is created. Moreover, one may achieve a particularly large opening of the terminal box which improves the accessibility to the inner space of the terminal box. Thus, for example a circuit board which almost completely fills out the inner space of the terminal box in cross section, may be inserted into the terminal box through this opening. With this preferred embodiment too, the cover preferably also additionally completely covers the axial end of the peripheral section of the terminal box.

Preferably, at least one electronic component is in contact with a region of the cover which covers the motor housing at the end side. In this manner, the electronic component may be arranged for example in a very central manner in the cover, so that a uniform heat distribution and thus an optimal heat removal may be achieved.

Further preferably, additionally or alternatively, at least one electronic component is in contact with a region of the cover which covers the peripheral section of the terminal box. This may be a section of the cover which covers the peripheral section at the axial side and/or on the peripheral side. Thus, one may arrange components whose waste heat is led away via the cover, in this region of the terminal box.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is a schematic sectioned view of a third preferred embodiment according to the present invention.

DETAILED DESCRIPTION OF THE INVENTION

Figure 1:
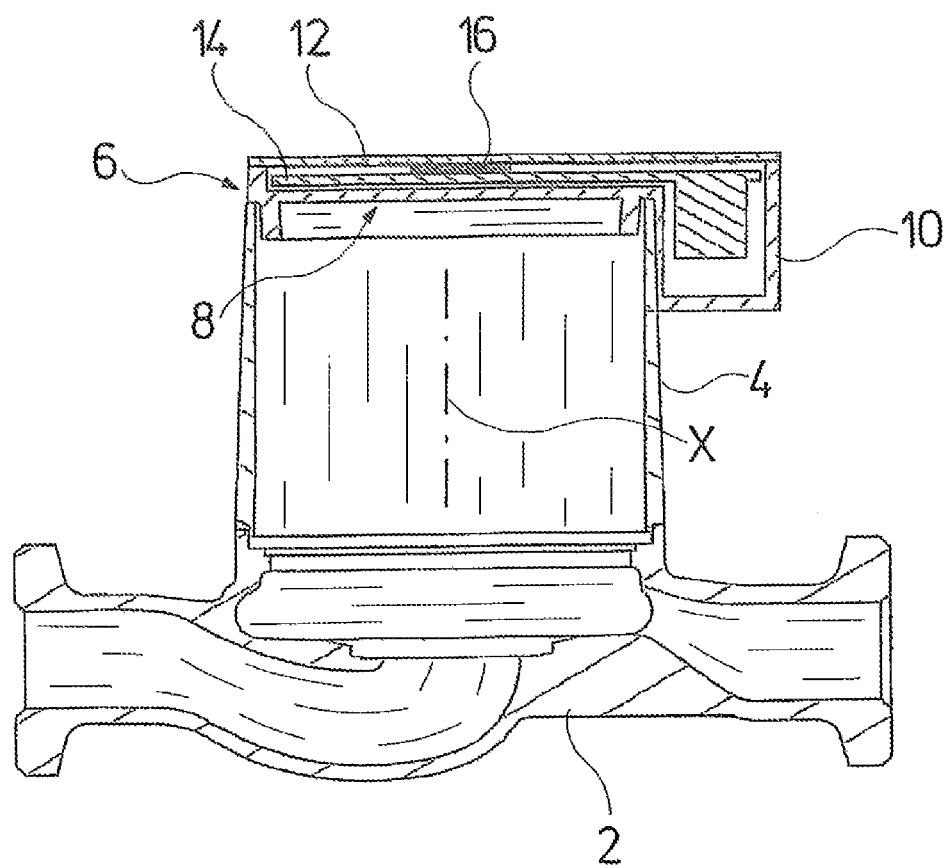
FIG. 1 is a schematic sectioned view of a pump assembly according to a first preferred embodiment of the present invention.

Certain terminology is used in the following description for convenience only and is not limiting. The word "outwardly" refers to a direction away from the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

The pump assembly according to the present invention, in all three shown preferred embodiments, in the known manner, includes a pump housing 2, in which an impeller (not shown) is arranged. A stator housing or motor housing 4 is applied onto the pump housing 2. The motor housing 4 is preferably designed in an essentially tubular manner and serves for receiving the electrical drive motor (not shown). The tubular motor housing 4 is preferably designed in an open manner at its axial ends which are opposite in the direction of a longitudinal axis X. It is applied onto the pump housing 2 with the one axial end, so that the pump housing 2 closes the first, open axial end of the motor housing 4. At an axial end of the motor housing 4 which is away from the pump housing 2, the motor housing is closed by an axially applied terminal box 6.

The terminal box 6 preferably includes two sections, specifically an axial section 8 and a peripheral section 10. The axial section 8 extends in an axial extension of the motor housing 4 and closes this at its open axial end-side. The peripheral section 10 of the terminal box extends from the axial section 8 radially outwardly and surrounds a part of the motor housing 4 at its periphery. Thereby, the peripheral section 10 does not extend over the complete periphery of the motor housing 4, but only over a section of the periphery. Thereby, in the example shown here, the peripheral section 10, in its axial extension parallel to the longitudinal axis X, is designed longer than the axial section of the terminal box 6. The peripheral section 10 extends in the direction of the pump housing 2 in the axial direction, further than the axial section 8. The extension of the axial section 8 and of the peripheral section 10 in the direction of the longitudinal axis X is essentially the same at the axial end which is away from the pump housing 2. This axial end-side of the motor housing 4 and of the terminal box 6, which is away from the pump housing 2, is closed by a cover 12, 12', 12". The cover 12, 12', 12" covers and closes the open, axial end of the terminal box 6. Thereby, the cover 12, 12', 12" covers the terminal box and thus the motor housing 4 at its axial end which is away from the pump housing 2 and furthermore also the axial side of the peripheral section 10 of the terminal box.

With the embodiment example according to FIG. 1, the cover 12 is designed as a plane plate of a thermally conductive plastic. An electronic component 14, for example a circuit board with electronic components which are arranged thereon, is arranged in the inside of the terminal box 6. The electronic component 14 is connected in a heat-conductive manner via a thermally conductive medium 16, directly to the inner side, i.e. the side of the cover 12 which faces the interior of the terminal box 6. In this manner, one ensures a good heat transition or a good thermal conductivity from the electronic component 14 onto the cover 12. Due to the thermal conductivity of the cover 12, the heat is then distributed in the cover 12 and is radiated away to the outside via the large cover surface. Since the surface of the cover covers the complete axial side of the motor housing 4 and of the peripheral section 10 of the terminal box, a maximally large cover surface is therefore created. The thermally conductive medium 16 is preferably deposited directly on an electronic component 14, for example on a power switch, so that its waste heat may be led away directly onto the cover 12.

Figure 2:
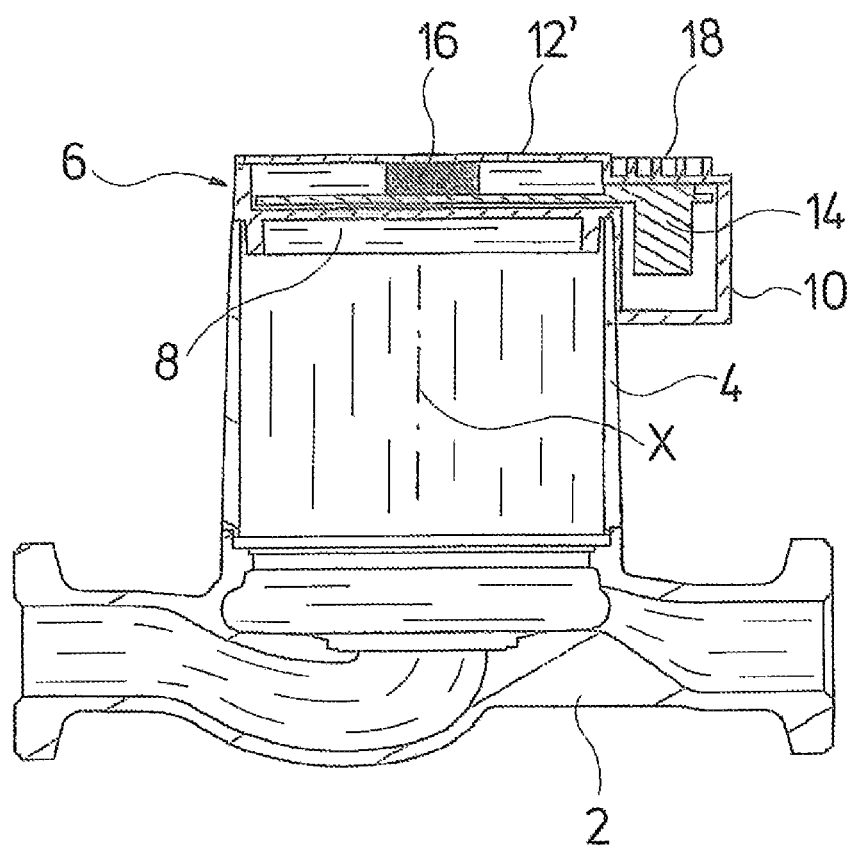
FIG. 2 is a schematic sectioned view of a pump assembly according to a second preferred embodiment of the present invention.

With the embodiment example according to FIG. 2, the arrangement of the electronic component 14 with the thermally conductive medium 16 on the inner side of the cover 12' corresponds to the arrangement according to FIG. 1, but here it is preferably only the geometric dimensions which differ slightly. A significant difference of the preferred embodiment according to FIG. 2 from the preferred embodiment according to FIG. 1 is the shape of the cover 12'. This is preferably likewise designed of a thermally conductive plastic, but is not designed as a plane plate. Thus the region which covers the peripheral section 10 of the terminal box 6, is designed stepped in the axial direction, with respect to the region which covers the axial end of the axial section 8. Additional cooling ribs 18 are formed on the cover 12' in this region on the peripheral section 10. The thermal radiating to the surrounding air is improved by way of these, due to the increased surface of the cover 12'. In this region of the cooling ribs 18, the electronic component 14 bears on the inner side of the cover 12', so that there, one may ensure a direct thermal transition to the cover 12' and thus to the cooling ribs 18. There too, a thermally conductive medium may be arranged between the electronic component 14 and the cover 12', in order to improve the thermal transition.

With the third preferred embodiment according to FIG. 3, the cover 12' on its outer side comprises outwardly directed ribs or projections 20. These too form cooling ribs which enlarge the surface of the cover 12' on its outer side, in order there to create an enlarged thermal radiating surface. Moreover, with this preferred embodiment, the cover 12' is designed such that it not only extends over the axial side of the terminal box 6, but also simultaneously covers a side wall or peripheral wall 22 of the peripheral section 10. The peripheral wall 22 is likewise provided with ribs or projections 20. The peripheral wall 22 extends essentially at right angles to the remaining part of the cover 12", which covers the axial side of the terminal box 6. This angled, enlarged design of the cover 12" on the one hand has the advantage that the cover surface and thus the surface, via which the heat may be led away, is increased, and on the other hand the opening of the terminal box 6 and in particular of the peripheral section of the terminal box 10, is enlarged, so that the interior of the terminal box is better accessible.

With the third preferred embodiment, an electronic component 14" is arranged in the axial region of the terminal box 8 according to the first two preferred embodiments, and there is in heat-conducting contact with the inner side of the cover 12" at several locations via a thermally conductive medium 16". The regions which here are in thermally conductive contact, are preferably the regions of a circuit board or an arrangement of electronic components, at which particularly much waste heat is produced, and for example it is hereby the case of power switches of the electronics which are preferably in bearing contact with the inner side of the cover 12" for heat removal.

With the preferred embodiment according to FIG. 3, moreover a further electronic component 24 in the peripheral section 10 of the terminal box is in heat-conducting bearing contact with the inner side of the peripheral wall 22. Thus, the waste heat produced by this electronic component 24 may be led away to the outside directly via the peripheral wall 22.

Common to all three shown preferred embodiments is the fact that the cover 12, 12', 12" permits the terminal box 6 to be completely closed to the outside, without cooling openings or ventilation openings becoming necessary. The heat-producing electronic components or construction parts bear on the inner side on the thermally conductive cover, so that the waste heat of the components is led away to the outside via the cover. It is to be understood that the geometric shaping of the covers 12, 12', 12" may also be designed differently, and in particular may be adapted to the shape and fashion of the complete pump assembly. Simultaneously, it is thereby preferable to enlarge the surface of the cover 12, 12', 12" in particular in the regions on the outer side, by way of cooling ribs 18 or projections 20 which lie above the electronic components arranged on the inner side, whose waste heat is to be led away.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A pump assembly comprising:
a motor housing (4) having an axial end-side;
a terminal box (6) including an axial section (8) and at least one peripheral section (10), the axial section (8) extending in an axial extension of the motor housing (4) and closing the axial end-side of the motor housing (4), the at least one peripheral section (10) being situated on an outer periphery of the motor housing (4); and a cover (12; 12'; 12") completely covering the axial section (8) and the at least one peripheral section (10) of the terminal box (6) on a side of the terminal box (6) opposite the motor housing (4), wherein the cover (12; 12'; 12") is designed in a heat-conducting manner and at an inner side thereof is in contact with at least one electronic component (14; 14", 24).

2. The pump assembly according to claim 1, wherein the cover (12; 12'; 12") is manufactured of an electrically insulating material.

3. The pump assembly according to claim 1, wherein the cover (12; 12'; 12") is formed of a thermally conductive plastic, with a specific thermal conductivity of larger than 1 W/mk.

4. The pump assembly according to claim 1, wherein the at least one electronic component (14; 14"; 24) is in contact with the cover (12; 12'; 12") via a thermally conductive paste or a thermally conductive pad (16; 16").

5. The pump assembly according to claim 1, wherein the at least one electronic component is integrated at least in sections into the cover (12; 12'; 12").

6. The pump assembly according to claim 5, wherein the at least one electronic component is cast into the cover (12, 12', 12").

7. The pump assembly according to claim 1, wherein the cover (12'; 12") on an outer side thereof comprises indentations or projections (18, 20) which enlarge the surface.

8. The pump assembly according to claim 1, wherein the cover (12") covers the at least one peripheral section (10) of the terminal box (6) additionally on at least one peripheral side (22) adjacent to the axial end-side.

9. The pump assembly according to claim 1, wherein the at least one electronic component (14; 14") is in contact with a region of the cover (12; 12'; 12").

10. The pump assembly according to claim 1, wherein the at least one electronic component (14) is in contact with a region of the cover (12').

11. The pump assembly according to claim 1, wherein the motor housing (4) surrounds a motor.

12. A pump assembly comprising:
a pump housing (2) at least partially surrounding an impeller;
a motor housing (4) at least partially surrounding a motor, the motor housing having a first, open axial end and an opposing second, open axial end, the motor housing being attached to the pump housing such that the motor housing extends outwardly beyond and outer periphery of the pump housing and the pump housing closes the first, open axial end of the motor housing;
a terminal box (6) including an axial section (8) and at least one peripheral section (10), the terminal box being attached to the motor housing such that the terminal box closes the second, open axial end of the motor housing and the at least one peripheral section being situated on an outer periphery of the motor housing;
at least one electronic component (14; 14", 24) positioned within the terminal box; and
a cover (12; 12'; 12") attached to the terminal box such that the cover closes the axial section and the at least one peripheral section of the terminal box on a side of the terminal box opposite the motor housing, the cover being formed of a thermally conductive material, an inner side of the cover being in contact with the at least one electronic component.

* * * * *